(12) United States Patent
Broussard et al.

(10) Patent No.: US 7,560,048 B2
(45) Date of Patent: Jul. 14, 2009

(54) LIQUID STABILIZING MIXTURES FOR ORGANIC POLYMERS

(75) Inventors: Fabio Broussard, Brusaporto-Bergamo (IT); Jose Roncalli, Bergamo (IT)

(73) Assignee: Great Lakes Chemical (Europe) GmbH, Frauenfield (DE)

( * ) Notice: Subject to any disclaimer, the term of this patent is extended or adjusted under 35 U.S.C. 154(b) by 415 days.

(21) Appl. No.: 11/175,048

(22) Filed: Jul. 6, 2005

(65) Prior Publication Data

US 2006/0089437 A1 Apr. 27, 2006

Related U.S. Application Data

(63) Continuation of application No. 10/257,400, filed as application No. PCT/EP01/04396 on Apr. 18, 2001, now abandoned.

(30) Foreign Application Priority Data

Apr. 20, 2000 (IT) .......................... MI2000A0886

(51) Int. Cl.
C09K 15/08 (2006.01)
(52) U.S. Cl. ................. 252/404; 252/397; 524/323; 524/325
(58) Field of Classification Search ................. 524/325, 524/323; 252/404
See application file for complete search history.

(56) References Cited

U.S. PATENT DOCUMENTS

| | | | |
|---|---|---|---|
| 3,305,522 A | 2/1967 | Spacht | |
| 4,360,486 A | 11/1982 | DiBiasi et al. | |
| 4,822,839 A * | 4/1989 | Paisner | 524/239 |
| 5,158,992 A | 10/1992 | Caselli et al. | |
| 5,480,940 A | 1/1996 | Khasat et al. | |
| 5,728,759 A * | 3/1998 | Pike | 524/270 |
| 5,760,099 A | 6/1998 | Horn et al. | |
| 5,869,565 A | 2/1999 | Clauss | |
| 2003/0144395 A1 | 7/2003 | Broussard et al. | |
| 2003/0189192 A1 | 10/2003 | Girelli et al. | |

FOREIGN PATENT DOCUMENTS

| | | |
|---|---|---|
| EP | 0 442 614 | 8/1991 |
| EP | 0 502 520 | 9/1992 |
| EP | 1 076 075 | 2/2001 |
| JP | 2000 103906 A | 4/2000 |

OTHER PUBLICATIONS

CAPLUS abstract, XP002177248, No. 2000:236136 of JP 2000 103906 (April 11, 2000).
JPO abstract for JP11-116949, Akashi, et al (April 27, 1999).
"Irganox ®1141 Liquid Stablizer for ABS/MBS" (1998, Ciba Specialty Chemicals Publication No. 016256.00.040 e/CH), obtained from: http://www.specialchem4polymers.com/sf/ciba/index.aspx?id=Antioxydants.
"Irganox ® 1141 Liquid Antioxidant for PVC" (1998, Ciba Specialty, Chemicals Publication No. 016272.00.040 e/CH), both obtained from: http://www.specialchem4polymers.com/sf/ciba/index.aspx?id=Antioxydants.

* cited by examiner

*Primary Examiner*—Tae H Yoon
(74) *Attorney, Agent, or Firm*—Jaimes Sher

(57) ABSTRACT

Liquid stabilizing mixtures for organic polymers comprising: a) a liquid compound belonging to the group of sterically hindered phenols consisting of esters or mixtures of esters having formula (I); b) a solid compound belonging to the group of sterically hindered phenols having formula (II).

8 Claims, No Drawings

LIQUID STABILIZING MIXTURES FOR ORGANIC POLYMERS

The present invention relates to liquid stabilizing mixtures for organic polymers.

More specifically, the present invention relates to liquid stabilizing mixtures for organic polymers comprising a liquid compound belonging to the group of sterically hindered phenols and a solid compound belonging to the group of sterically hindered phenols and their use in the stabilization of organic polymers to degradation caused by oxygen, heat and/or light.

The present invention also relates to the polymeric compositions stabilized with the above stabilizing mixtures and the end-products obtained by their processing.

It is known that the use of additives in the solid state often causes various problems. For example, in some cases, additives in the solid state which are in the form of crystalline powders, flakes or drops in the vitreous state, are ground to very fine powders before being added to latex emulsions of natural or synthetic rubber to prevent granules of additives from remaining in the end-product after coagulation of the latex, drying and vulcanization.

Another disadvantage is the addition of an additive in the solid state in a process in which said additive is added in a particular processing step such as, for example, during the mixing of copolymers, or during polymerization and/or copolymerization. This problem arises, for example, when the solid stabilizer must be added to a solution or emulsion of a polymer at the end of the polymerization such as, for example, in the preparation of the following polymers: polyols, polyurethanes, nitrile rubbers, SBR, polyisoprene, polybutadiene, ABS, PVC, etc. In these cases, it is necessary to separately prepare a solution of the additive in a suitable organic solvent or an aqueous dispersion thereof and add said solution or dispersion to the solution or emulsion of the polymer.

The Applicant has now found liquid stabilizing mixtures comprising a liquid compound belonging to the group of sterically hindered phenols and a solid compound belonging to the group of sterically hindered phenols which are capable of overcoming the drawbacks of the known art. These mixtures are capable of permanently remaining liquid, both at room temperature and at temperatures lower than 0° C. (for example, as low as −30° C.), and can consequently be used whenever the addition of a stabilizer in solid form is particularly complex.

An object of the present invention therefore relates to liquid stabilizing mixtures for organic polymers comprising:
(a) a liquid compound belonging to the group of sterically hindered phenols consisting of esters or mixtures of esters having general formula (I):

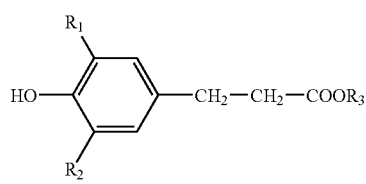

wherein:
$R_1$ and $R_2$, the same or different, represent a linear or branched $C_1$-$C_{18}$ alkyl group;
$R_3$ represents a linear or branched $C_8$-$C_{18}$ alkyl group, or one of the following groups:

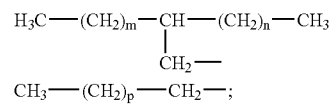

wherein m and n are an integer ranging from 0 to 11, extremes included; and m+n is 10 or 11;
and p is 12 or 13;
(b) a solid compound belonging to the group of sterically hindered phenols having formula (II):

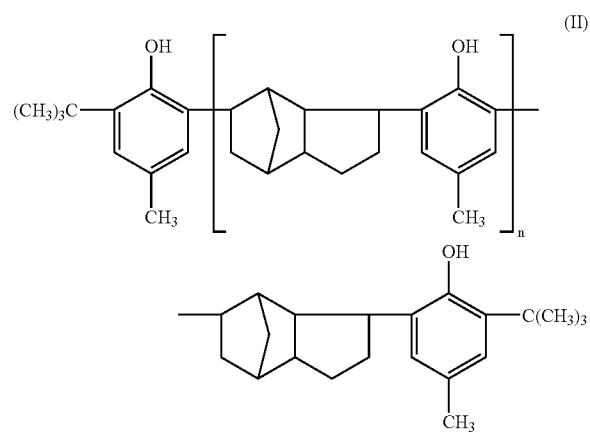

wherein n is an integer ranging from 0 to 10, extremes included.

Examples of linear or branched $C_1$-$C_{18}$ alkyl groups are: methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, pentadecyl, hexadecyl, heptadecyl, octadecyl, etc.

Preferred liquid compounds belonging to the group of sterically hindered phenols (a) for the purposes of the present invention are those wherein $R_1$ and $R_2$, the same or different, are: methyl, ethyl, isopropyl, t-butyl; and $R_3$ represents one of the following groups:

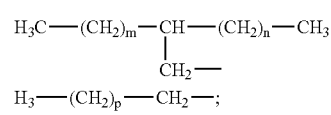

wherein m, n and p have the same meanings defined above.

Specific examples of liquid compounds belonging to the group of sterically hindered phenols (a) useful for the purposes of the present invention are Anox ® BF (a sterically hindered phenol) of Great Lakes Chemical Corporation and Irganox ® (a sterically hindered phenol) 1135 of Ciba.

A specific example of a solid compound belonging to the group of sterically hindered phenols (b) useful for the purposes of the present invention is Lowinox ® CPL (a polymeric sterically hindered phenol) of Great Lakes Chemical Corporation, also known as Wingstay ® L (a polymeric sterically hindered phenol) of Goodyear.

The liquid compounds belonging to the group of sterically hindered phenols (a) are commercial compounds or, they can be prepared by the transesterification of a methyl ester having general formula (III)

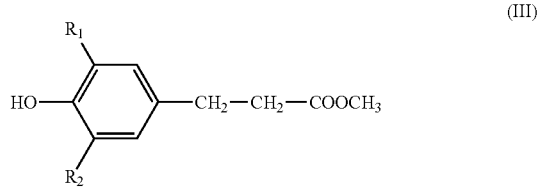

wherein $R_1$ and $R_2$ have the same meanings described above, with an alcohol or a mixture of alcohols having general formula (IV):

$$R_3\text{—OH} \qquad (IV)$$

wherein $R_3$ has the same meanings described above, in the presence of catalysts based on tin or zinc such as, for example, dibutyl tin dilaurate, dibutyl tin oxide, zinc octanoate, etc., as described, for example, in the patent EP 502,520.

The solid compound belonging to the group of sterically hindered phenols (b) is a commercial product or, it can be prepared by the reaction of p-cresol with dicyclopentadiene and subsequent alkylation with isobutylene, in the presence of acid catalysts such as, for example, boron trifluoride, methanesulfonic acid, p-toluene-sulfonic acid, etc., as described, for example, in the patent GB 1,068,995.

The liquid stabilizing mixtures, object of the present invention, can be prepared by means of various processes.

One process for the preparation of the above liquid stabilizing mixtures comprises:
(a') heating the liquid compound belonging to the group of sterically hindered phenols (a) to a temperature ranging from 60° C. to 180° C., under stirring;
(b') adding the solid compound belonging to the group of sterically hindered phenols (b), maintaining the temperature within the range of 60° C. to 180° C., preferably from 90° C. to 140° C., and maintaining the whole mixture under stirring until the complete dissolution of said compound (b), for a time ranging from 5 minutes to 100 minutes, preferably from 10 minutes to 60 minutes, obtaining a liquid mixture.

The liquid mixture thus obtained is discharged into drums or tanks and remains permanently liquid, without re-precipitations of the solid compound belonging to the group of sterically hindered phenols (b), both at room temperature and at temperatures lower than 0° C. as already specified above.

The weight ratios between the liquid compound belonging to the group of sterically hindered phenols (a), and the solid compound belonging to the group of sterically hindered phenols (b) range from 90:10 to 30:70, preferably from 80:20 to 50:50, even more preferably from 60:40 to 70:30.

In an alternative process, at the end of the preparation procedure of the solid compound belonging to the group of sterically hindered phenols (b) obtained as described in patent GB 1,068,995 which forms an integrant part of the present patent application, and more specifically, after neutralization of the catalyst used, neutral washings and distillation of the reaction solvent, before pouring said liquid compound (b), melted at 175° C., on a tape and cooling it to obtain drops or flakes, the liquid compound belonging to the group of sterically hindered phenols (a) is added directly; the procedure is carried out under stirring and under the same operating conditions as step (b') described above, obtaining the liquid stabilizing mixture desired.

The liquid stabilizing mixtures, object of the present invention, are capable of stabilizing organic polymers against degradation caused by oxygen, heat and/or light. Examples of organic polymers to which they can be added are:

1. Polymers of mono-olefins and di-olefins such as, for example, polypropylene, polyisobutylene, polybut-1-ene, poly-4-methylpent-1-ene, polyisoprene or polybutadiene; as well as polymers of cyclo-olefins such as, for example, cyclopentene or norbornene; polyethylene (which can be optionally cross-linked) such as, for example, high density polyethylene (HDPE), high density and high molecular weight polyethylene (HDPE-HMW), high density and ultrahigh molecular weight polyethylene (HDPE-UHMN), medium density polyethylene (MDPE), low density polyethylene (LDPE), linear low density polyethylene (LLDPE), branched low density polyethylene (BLDPE), (VLDPE), (ULDPE).

Polyolefins such as, for example the mono-olefins mentioned in the above paragraph, preferably polyethylene and polypropylene, can be prepared with many methods known in literature, preferably using the following methods:
a) radicalic polymerization (generally carried out at a high pressure and high temperature);
(b) catalytic polymerization using a catalyst which normally contains one or more metals of groups IVb, Vb, VIb or VIII of the Periodic Table. These metals generally have one or more ligands such as, for example, oxides, halides, alcoholates, esters, ethers, amines, alkyls, alkenyls and/or aryls which can be π- or σ-coordinated. These metal complexes can be in free form or supported on substrates such as, for example, activated magnesium chloride, titanium(III) chloride,. alumina or silicon oxide. Said catalysts can be soluble or insoluble in the polymerization medium. The catalysts can be used alone or in the presence of other activators such as, for example, metal alkyls, metal hydrides, halides of metal alkyls, oxides of metal alkyls or metal alkyloxanes, these metals being elements belonging to groups Ia, IIa and/or IIIa of the Periodic Table. The activators can be conveniently modified with other ester, ether, amine or silyl-ether groups. These catalytic systems are usually called Phillips, Standard Oil Indiana, Ziegler(-Natta), TNZ (Du-Pont), metallocene or "single site catalyst" (SSC).

2. Mixtures of the polymers described under point (1) such as, for example, mixtures of polypropylene with polyisobutylene; mixtures of polypropylene with polyethylene (for example, PP/HDPE, PP/LDPE); mixtures of different types of polyethylene (for example, LDPE/HDPE).

3. Copolymers of mono-olefins and di-olefins with each other or with other vinyl monomers such as, for example, ethylene/propylene copolymers, linear low density polyethylene (LLDPE) and its mixtures with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as, for example, hexadiene, dicyclopentadiene or ethylidene-norbornene; and also mixtures of said copolymers with each other or with the polymers cited in under point (1) such as, for example, polypropylene/ethylene/propylene copolymers, LDPE/ethylene/vinylacetate. (EVA) copolymers, LDPE/ethylene/acrylic acid (EAA) copolymers, LLDPE/EVA, LLDPE/EAA, and alternating or random polyalkylene/carbon monoxide copolymers and their mixtures with other polymers such as, for example, polyamides.

4. Hydrocarbon resins (for example, $C_5$-$C_9$) comprising their hydrogenated modifications (for example, adhesive resins) and mixtures with polyalkylene and starch.

5. Polystyrene, poly(p-methylstyrene), poly(α-methylstyrene).

6. Copolymers of styrene or α-methylstyrene with dienes or acrylic derivatives such as, for example, styrene/butadiene, styrene/acrylonitrile, styrene/alkyl methacrylate, styrene/butadiene/alkyl acrylate, styrene/ butadiene/alkyl methacrylate, styrene/maleic anhydride, styrene/acrylonitrile/methyl acrylate; mixtures, having a high tensile strength, between copolymers of styrene and another polymer such as, for example, a polyacrylate, a polymer of a diene or an ethylene/propylene/diene terpolymer, block copolymers of styrene such as, for example, styrene/butadiene/styrene, styrene/isoprene/styrene, styrene/ethylene/butylene/styrene or styrene/ethylene/propylene/styrene.

7. Grafted copolymers of styrene or of α-methylstyrene such as, for example, styrene in polybutadiene, styrene in polybutadiene/styrene or polybutadiene/acrylonitrile copolymers; styrene and acrylonitrile (or methacrylonitrile) in polybutadiene; styrene, acrylonitrile and methylmethacrylate in polybutadiene; styrene and maleic anhydride in polybutadiene; styrene, acrylonitrile and maleic anhydride or maleimide in polybutadiene; styrene and maleimide in polybutadiene; styrene and alkylacrylates or alkylmethacrylates in polybutadiene; styrene and acrylonitriue in ethylene/propylene/diene terpolymers, styrene and acrylonitrile in polyalkyl acrylates or polyalkyl methacrylates, styrene and acrylonitrile in acrylate/butadiene copolymers, as well as mixtures of the copolymers listed above with the copolymers cited under point (6) such as, for example, mixtures of known copolymers such as ABS, MBS, ASA or AES.

8. Polymers containing halogens such as, for example, polychloroprene, chlorinated rubbers, chlorinated or brominated isobutylene-isoprene copolymers ("halobutyl rubber"), chlorinated or chlorosulfonated polyethylene, ethylene and chlorinated ethylene copolymers, homopolymers and copolymers of epichlorohydrin, in particular polymers of vinyl compounds containing halogens such as, for example, polyvinyl chloride, polyvinylidene chloride, polyvinyl fluoride or polyvinylidene fluoride; and also their copolymers such as, for example, vinyl chloride/vinylidene chloride, vinyl chloride/vinyl acetate or vinylidene chloride/vinyl acetate.

9. Polymers deriving from α,β-unsaturated acids and their derivatives such as, for example, polyacrylates and polymethacrylates, polymethyl methacrylates, polyacrylamides and polyacrylonitriles, impact modified with butyl acrylate.

10. Copolymers of monomers according to point (9) with each other or with other unsaturated monomers such as, for example, acrylonitrile/butadiene copolymers, acrylonitrile/alkyl acrylate copolymers, acrylonitrile/alkoxyalkyl acrylate copolymers or acrylonitrile/vinyl halide copolymers or acrylonitrile/alkyl methacrylate/butadiene terpolymers.

11. Polymers deriving from unsaturated alcohols and amines, or their acyl or acetal derivatives such as, for example, polyvinyl alcohol, polyvinyl acetate, polyvinyl stearate, polyvinyl benzoate, polyvinyl maleate, polyvinyl butyral, polyallyl phthalate or polyallyl melamine; and also their copolymers with the olefins listed under point (1)

12. Homopolymers and copolymers of open-chain ethers or cyclic ethers such as, for example, polyalkylene glycols, polyethylene oxide, polypropylene oxide, or copolymers of the compounds described above with bis-glycidyl ethers.

13. Polyacetals such as, for example, polyoxymethylene and those polyoxymethylenes containing comonomers, for example, ethylene oxide; polyacetals modified with thermoplastic polyurethanes, acrylates or MBS.

14. Polyphenylene oxides and sulfides and their mixtures with styrene polymers or polyamides.

15. Polyurethanes deriving from hydroxyl-terminated polyethers, polyesters or polybutadienes on the one hand and aliphatic or aromatic polyisocyanates on the other, as well as their precursors.

16. Polyamides and copolyamides deriving from diamines and dicarboxylic acids and/or aminocarboxylic acids or from the corresponding lactams such as, for example, polyamide 4, polyamide 6, polyamide 6/6, 6/10, 6/9, 6/12, 4/6, 12/12, polyamide 11, polyamide 12, aromatic polyamides obtained starting from m-xylene diamine and adipic acid; polyamides prepared from hexamethylenediamine and isophthalic and/or terephthalic acid and with or without an elastomer as modifier, for example, poly-2,4,4-trimethylhexamethylene terephthalamide or poly-m-phenylene isophthalamide; and also block copolymers of the above polyamides with polyolefins, olefinic copolymers, ionomers or elastomers chemically bound or grafted; or with polyethers such as, for example, polyethylene glycol, polypropylene glycol or polytetramethylene glycol; as well as polyamides or copolyamides modified with EPDM or ABS; and polyamides condensed during processing ("RIM polyamide system").

17. Polyureas, polyimides, polyamide-imides, polyetherimides, polyesterimides, polyhydantoins, and polybenzoimidazoles.

18. Polyesters deriving from dicarboxylic acids and diols and/or from hydroxycarboxylic acids or from the corresponding lactones such as, for example, polyethylene terephthalate, polybutylene terephthalate, poly-1,4-dimethylolcyclohexane terephthalate and polyhydroxybenzoates, as well as block copolyether esters deriving from polyethers with hydroxyl-terminated groups; and also polyesters modified with polycarbonates or MBS.

19. Polycarbonates and polyester carbonates.

20. Polysulfones, polyethersulfones and polyetherketones.

21. Cross-linked polymers deriving from aldehydes on the one hand and from phenols, urea and melamines on the other, such as, for example, phenol/formaldehyde resins, urea/formaldehyde resins and melamine/formaldehyde resins.

22. Dried or non-dried alkyd resins.

23. Resins based on unsaturated polyesters deriving from copolyesters of dicarboxylic acids saturated and unsaturated with polyhydric alcohols and vinyl compounds as cross-linking agents, and also the above resins containing halogens and having a good flame-resistance.

24. Cross-linkable acrylic resins deriving from substituted acrylates such as, for example, epoxy acrylates, urethane acrylates or polyester acrylates.

25. Alkyd resins, resins based on polyesters or acrylated resins cross-linked with melamine resins, resins based on urea, resins based on isocyanates, resins based on isocyanurates, resins based on polyisocyanates or epoxy resins.
26. Cross-linked epoxy resins deriving from aliphatic, cycloaliphatic, heterocyclic or aromatic glycidyl compounds such as, for example, products of diglycidyl ethers of bisphenol A and bisphenol F, which are cross-linked with the usual cross-linking agents such as, for example, anhydrides or amines, in the presence of or without accelerating agents.
27. Natural polymers such as, for example, cellulose, natural rubber, gelatin, and their derivatives chemically modified to give homologous polymers such as, for example, cellulose acetates, propionates and butyrates, or cellulose ethers such as methyl-cellulose; as well as hydrocarbon resins ("rosins") and their derivatives.
28. Mixtures of the above polymers ("polyblends") such as, for example, PP/EPDM, polyamides/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylates, POM/MBS, PPO/HIPS, PPO/PA 6.6 and copolymers, PA/HDPE, PA/PP, PA/PPO, PBT/PC/ABS, PBT/PET/PC.
29. Natural or synthetic organic materials which are pure monomeric compounds or mixtures of said compounds, such as, for example, mineral oils, animal or vegetable oils, fats or waxes, oils, fats or waxes based on synthetic esters (for example, phthalates, adipates, phosphates, trimellitates), as well as mixtures of synthetic esters with mineral oils in any weight ratio, in particular those used in spinning compositions, as well as aqueous emulsions of said organic materials.
30. Aqueous emulsions of natural or synthetic rubbers such as, for example, natural latex or latexes based on carboxylated styrene-butadiene copolymers.
31. Natural or synthetic rubbers such as, for example, acrylic rubbers, nitrile rubbers, thermoplastic rubbers (for example, SIS, SBS, etc.), polyisoprene, polybutadiene, polychloroprene, SBR, EPDM, both before and after vulcanization.

The organic polymers which can be stabilized with the liquid stabilizing mixtures, object of the present invention, are, preferably, natural, semi-synthetic or synthetic polymers selected from those described above. More preferably, the liquid stabilizing mixtures, object of the present invention, are useful in the stabilization of polymers indicated above under point 30 and 31.

A further object of the present invention therefore relates to polymeric compositions containing an organic polymer and an effective quantity of one of the liquid stabilizing mixtures, object of the present invention. Yet another object of the present invention relates to the end-products obtained from the processing of the above polymeric compositions.

The liquid stabilizing mixtures, object of the present invention, are added to the organic polymers to be stabilized in a quantity ranging from 0.01% to 2.5% with respect to the weight of the organic polymer to be stabilized, preferably from 0.03% to 2%, for example from 0.1% to 1%.

The liquid stabilizing mixtures object of the present invention can optionally contain other stabilizers (co-stabilizers).

Stabilizers for organic polymers useful for the purpose are selected from the following groups:
1. Antioxidants
1.1 Alkylated monophenols such as, for example: 2,6-di-t-butyl -4-methylphenol; 2-t-butyl-4,6-dimethylphenol; 2,6-di-t-butyl-4-ethylphenol; 2,6-di-t-butyl-4-n-butylphenol; 2,6-di-t-butyl-4-isobutylphenol; 2,6-dicyclopentyl -4-methylphenol; 2-(α-methylcyclohexyl)-4,6-dimethylphenol; 2,6-dioctadecyl-4-methylphenol; 2,4,6-tricyclohexylphenol; 2,6-di-t-butyl-4-methoxymethylphenol; nonylphenols with a linear or branched alkyl chain such as, for example, 2,6-dinonyl-4-methylphenol; 2,4-dimethyl -6-(1'-methylundec-1'-yl)phenol; 2,4-dimethyl-6-(1'-methylheptadec-1'-yl)phenol; 2,4-dimethyl-6-(1'-methyltridec-1'-yl)phenol; and their mixtures.
1.2 Alkylthiomethylphenols such as, for example: 2,4-dioctylthiomethyl -6-t-butylphenol; 2,4-dioctylthiomethyl-6-methylphenol; 2,4-dioctylthiomethyl-6-ethylphenol; 2,6-didodecylthiomethyl -4-nonylphenol.
1.3 Hydroquinones and alkylated hydroquinones such as, for example: 2,6-di-t-butyl-4-methoxyphenol; 2,5-di-t-butylhydroquinone; 2,5-di-t-amylhydroquinone; 2,6-diphenyl -4-octadecyloxyphenol; 2,6-di-t-butylhydroquinone; 2,5-di-t-butyl-4-hydroxyanisol; 3,5-di-t-butyl-4-hydroxyanisol; 3,5-di-t-butyl-4-hydroxyphenyl stearate; bis(3,5-di-t-butyl -4-hydroxyphenyl)adipate.
1.4 Tocopherols such as, for example: α-tocopherol, β-tocopherol, γ-tocopherol, δ-tocopherol and their mixtures (Vitamin E).
1.5 Hydroxylated thiodiphenyl ethers such as, for example 2,2'-thiobis-(6-t-butyl-4-methylphenol); 2,2'-thiobis-(4-octylphenol); 4,4'-thiobis-(6-t-butyl-3-methylphenol); 4,4'-thiobis-(6-t-butyl-2-methylphenol); 4,4'-thiobis-(3,6-di-s-amylphenol); 4,4'-bis-(2,6-dimethyl-4-hydroxyphenyl)disulfide.
1.6 Alkylidene-bisphenols such as, for example: 2,2'-methylenebis-(6-t-butyl-4-methylphenol); 2,2'-methylene-bis-(6-t-butyl-4-ethylphenol); 2,2'-methylenebis[4-methyl -6-(α-methylcyclohexyl)phenol]; 2,2'-methylene-bis(4-methyl -6-cyclohexylphenol); 2,2'-methylenebis(6-nonyl-4-methylphenol); 2,2'-methylenebis(4,6-di-t-butylphenol); 2,2'-ethylidenebis(4,6-di-t-butylphenol); 2,2'-ethylidenebis (6-t-butyl-4-isobutylphenol); 2,2'-methylenebis[6-(α-methylbenzyl) -4-nonylphenol]; 2,2'-methylenebis[6-(α,α-dimethylbenzyl) -4-nonylphenol]; 4,4'-methylenebis(2,6-di-t-butylphenol); 4,4'-methylenebis(6-t-butyl-2-methylphenol); 1,1-bis(5-t-butyl-4-hydroxy-2-methylphenyl)butane; 2,6-bis(3-t-butyl-5-methyl-2-hydroxybenzyl) -4-methylphenol; 1,1,3-tris-(5-t-butyl-4-hydroxy-2-methylphenyl)butane; 1,1-bis(5-t-butyl-4-hydroxy-2-methylphenyl) -3-n-dodecylmercaptobutane; ethyleneglycol bis[3,3-bis-(3'-t-butyl-4'-hydroxyphenyl) butyrate]; bis-(3-t-butyl -4-hydroxy-5-methylphenyl)dicyclopentadiene; bis[2-(3'-t-butyl-2'-hydroxy-5'-methylbenzyl)-6-t-butyl-4-methylphenyl]terephthalate; 1,1-bis(3,5-dimethyl-2-hydroxyphenyl)butane; 2,2-bis(3,5-di-t-butyl-4-hydroxyphenyl) propane; 2,2-bis(5-t-butyl-4-hydroxy-2-methylphenyl)-4-n-dodecylmercaptobutane; 1,1,5,5-tetra(5-t-butyl-4-hydroxy -2-methylphenyl)pentane.
1.7 Benzyl compounds containing O, N or S such as, for example: 3,5,3',5'-tetra-t-butyl-4,4'-dihydroxydibenzylether; octadecyl-4-hydroxy-3,5-dimethylbenzylmercaptoacetate; tridecyl-4-hydroxy-3,5-di-t-butyl-benzylmercaptoacetate; tris(3,5-di-t-butyl-4-hydroxybenzyl) amine; bis (4-t-butyl-3-hydroxy-2,6-dimethylbenzyl) dithioterephthalate; bis(3,5-di-t-butyl-4-hydroxybenzyl) sulfide; isooctyl -3,5-di-t-butyl-4-hydroxybenzylmercaptoacetate.
1.8 Hydroxybenzylated malonates such as, for example: dioctadecyl-2,2-bis(3,5-di-t-butyl-2-hydroxybenzyl)malonate; dioctadecyl-2-(3-t-butyl-4-hydroxy-5-methylbenzyl)-malonate; didodecylmercaptoethyl-2,2-bis(3,5-di-t- butyl -4-hydroxybenzyl)malonate; bis[4-(1,1,3,3-tetramethylbutyl)phenyl]-2,2-bis(3,5-di-t-butyl-4-hydroxybenzyl)-malonate.

1.9 Aromatic hydroxybenzyl compounds such as, for example: 1,3,5-tris (3,5-di-t-butyl-4-hydroxybenzyl)-2,4, 6-trimethylbenzene; 1,4-bis- (3,5-di-t-butylhydroxybenzyl) -2,3,5,6-tetramethylbenzene; 2,4,6-tris (3,5-di-t-butyl-4-hydroxybenzyl)phenol.

1.10 Triazine compounds such as, for example: 2,4-bis(octylmercapto) -6-(3,5-di-t-butyl-4-hydroxyaniline) -1,3,5-triazine; 2-octylmercapto-4,6-bis(3,5-di-t-butyl-4-hydroxyaniline)-1,3,5-triazine; 2-octylmercapto-4,6-bis-(3, 5-di-t-butyl-4-hydroxyphenoxy)-1,3,5-triazine; 2,4,6-tris-(3,5-di-t-butyl-4-hydroxyphenoxy)-1,2,3-triazine; 1,3,5-tris(3,5-di-t-butyl-4-hydroxybenzyl)isocyanurate; 1,3,5-tris(4-t-butyl-3-hydroxy-2,6-dimethylbenzyl) isocyanurate; 2,4,6-tris-(3,5-di-t-butyl-4-hydroxyphenylethyl) -1,3,5-triazine; 1,3,5-tris(3,5-di-t-butyl-4-hydroxyphenylpropionyl)hexahydro-1,3,5-triazine; 1,3,5-tris(3,5-dicyclohexyl -4-hydroxybenzyl) isocyanurate.

1.11 Benzylphosphonates such as, for example: dimethyl-2, 5-di-t-butyl-4-hydroxybenzylphosphonate; diethyl-3,5-di-t-butyl -4-hydroxybenzylphosphonate; dioctadecyl-3, 5-di-t-butyl -4-hydroxybenzylphosphonate; dioctadecyl-5-t-butyl -4-hydroxy-3-methylbenzylphosphonate; calcium salts of monoethyl ester of 3,5-di-t-butyl-4-hydroxybenzylphosphonic acid.

1.12 Acylaminophenols such as, for example: 4-hydroxylauranilide; 4-hydroxystearanilide; octyl-N-(3,5-di-t-butyl -4-hydroxyphenyl)carbamate.

1.13 Esters of β-(3,5-di-t-butyl-4-hydroxyphenyl)propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis (hydroxyethyl)oxalamide, 3-thioundecanol, 3-thiopentadecanol, trimethylhexanediol, trimethylolpropane, 4-hydroxymethyl -1-phospho-2,6,7-trioxabicyclo-[2.2.2]-octane.

1.14 Esters of 1-(5-t-butyl-4-hydroxy-3-methylphenyl)propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thioundecanol, 3-thiopentadecanol, trimethylhexanediol, trimethylolpropane, 4-hydroxymethyl -1-phospho-2,6,7-trioxabicyclo[2.2.2 ]octane.

1.15 Esters of β-(3,5-dicyclohexyl-4-hydroxyphenyl)propionic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl)oxamide, 3-thioundecanol, 3-thiopentadecanol, trimethylhexanediol, trimethylolpropane, 4-hydroxymethyl -1-phospho-2,6,7-trioxabicyclo[2.2.2]-octane.

1.16 Esters of (3,5-di-t-butyl-4-hydroxyphenyl) acetic acid with monohydric or polyhydric alcohols such as, for example: methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythtitol, tris (hydroxyethyl) isocyanurate, N,N'-bis(hydroxyethyl)oxamide, 3-thioundecanol, 3-thiopentadecanol, trimethylhexanediol, trimethylolpropane, 4-hydroxymethyl-1-phospho -2,6,7-trioxabicyclo[2.2.2]octane.

1.17 Amides of β-(3,5-di-t-butyl-4-hydroxyphenyl)propionic acid such as, for example: N,N'-bis(3,5-di-t-butyl-4-hydroxyphenylpropionyl)hexamethylenediamide; N,N'-bis-(3,5-di-t-butyl-4-hydroxyphenylpropionyl) trimethylenediamide; N,N'-bis(3,5-di-t-butyl-4-hydroxyphenylpropionyl) hydrazide; N,N'-bis[2-(3-[3,5-di-t-butyl-4-hydroxyphenyl]propionyloxy)ethyl]oxamide (Naugard ® XL-1 of Uniroyal)

1.18 Ascorbic acid (vitamin C).

1.19 Aminic antioxidants such as, for example, N,N'-diisopropyl-p-phenylenediamine; N,N'-di-s-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-dicyclohexyl-p-phenylenediamine; N,N'-diphenyl-p-phenylenediamine; N,N'-bis(2-naphthyl)-p-phenylenediamine; N-isopropyl-N'-phenyl-p-phenylenediamine; N-(1,3-dimethylbutyl)-N'-phenyl-p-phenylenediamine; N-(1-methylheptyl)-N'-phenyl-p-phenylenediamine; N-cyclohexyl-N'-phenyl-p-phenylenediamine; 4-(p-toluenesulfonamide) diphenyleneamine; N,N'-dimethyl-N,N'-di-s-butyl-p-phenylenediamine; diphenylamine; N-allyldiphenylamine; 4-isopropoxydiphenylamine; N-phenyl-1-naphthylamine; N-(4-t-octyl-phenyl)1-naphthylamine; N-phenyl-2-naphthylamine; di-phenylamine octylate such as, for example, p,p'-di-t-octyldiphenylamine; 4-n-butylaminophenol; 4-butirylaminophenol; 4-nonanoylaminophenol; 4-dodecanoylaminophenol; 4-octadecanoylaminophenol; bis(4-methoxyphenyl) amine; 2,6-di-t-butyl-4-dimethylaminomethylphenol; 2,4'-diaminodiphenylmethane; 4,4'-diaminodiphenylmethane; N,N,N',N'-tetramethyl-4,4'-diaminodiphenylmethane; 1,2-bis[(2-methylphenyl)amino]ethane; 1,2-bis (phenylamino)propane; (o-tolyl)biguanide; bis [4-(1',3'-dimethylbutyl)phenyl]amine; N-phenyl-1-naphthylamine t-octylate; mixture of mono- and dialkylated t-butyl/t-octyldiphenylamines; mixture of mono- and dialkylated nonyldiphenylamines; mixture of mono- and dialkylated dodecyldiphenylamines; mixture of mono- and dialkylated isopropyl/isohexyldiphenylamines; mixture of mono- and dialkylated t-butyl-diphenylamines; 2,3-dihydro -3,3-dimethyl-4H-1,4-benzothiazine; phenothiazine; mixture of mono- and dialkylated t-butyl/t-octylphenothiazines; mixture of mono- and dialkylated t-octylphenothiazines; N-allyl-phenothiazine; N,N,N',N'-tetraphenyl -1,4-diaminobut-2-ene; N,N-bis (2,2,6,6-tetramethylpiperid -4-yl) hexa-methylenediamine; bis-(2,2,6,6-tetramethylpiperidin-4-yl) sebacate; 2,2,6,6-tetramethylpiperidin -4-one; 2,2,6,6-tetramethylpiperidin -4-ol.

2. UV ray and light stabilizers.

2.1 Derivatives of 2-(2'-hydroxyphenyl)benzotriazoles such as, for example: 2-(2'-hydroxy-5'methylphenyl)benzotriazole; 2-(3',5'-di-t-butyl-2'-hydroxyphenyl)benzotriazole; 2-(5'-t-butyl-2'-hydroxyphenyl)benzotriazole; 2-[2'-hydroxy-5'-(1,1,3,3-tetramethylbutyl)phenyl]benzotriazole; 2-(3',5'-di-t-butyl-2'-hydroxyphenyl)-5-chlorobenzotriazole; 2-(3'-t-butyl-2'-hydroxy-5'-methylphenyl)-5-chlorobenzotriazole; 2-(3'-s-butyl-5'-t-butyl-2'-hydroxyphenyl)benzotriazole; 2-(2'-hydroxy-4'-octyloxyphenyl) benzotriazole; 2-(3',5'-di-t-amyl-2'-hydroxyphenyl) benzotriazole; 2-[3',5'-bis(α,α-dimethylbenzyl)-2'- hydroxyphenyl]benzotriazole; 2-[3'-t-butyl-2'-hydroxy-5'-(2-octyloxycarbonylethyl)phenyl]-5-chlorobenzotriazole, 2-[3'-t-butyl-5'-(2-(2-ethylhexyloxy) carbonylethyl)-2'-hydroxyphenyl]-5-chlorobenzotriazole, 2-[3'-t-butyl-2'-hydroxy-5'-(2-methoxycarbonylethyl) phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5'-(2-octyloxycarbonylethyl) phenyl benzotriazole, 2-[3'-t-butyl-5'-(2-(2-ethylhexyloxy)carbonylethyl)-2'-hydroxyphenyl]benzotriazole, 2-(3'-dodecyl-2'-hydroxy-5'-methylphenyl)benzotriazole; 2-(3'-t-butyl-2'-hydroxy-5'-(2-isooctyloxycarbonylethyl)phenyl] benzotriazole, 2,2'-methylene-bis [4-(1,1,3,3-tetramethylbutyl)-6-benzotriazol-2-yl-phenol]; transesterification product of 2-[3'-t-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$— wherein R= 3'-t-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)phenyl] benzotriazole; 2-[2'-hydroxy-3'-(1,1,3,3-tetramethylbutyl)-5'-(α,α-dimethylbenzyl)phenyl]benzotriazole.

2.2 Benzotriazoles deriving from hydantoin such as those described, for example in patent applications EP 867,435, WO 99/23093 and WO 99/37638.

2.3 Derivatives of 2-hydroxybenzophenones such as, for example: 4-hydroxy-; 4-methoxy-; 4-octyloxy-; 4-decyloxy-; 4-dodecyloxy-; 4-benzyloxy-; 4,2',4'-trihydroxy-; 2'-hydroxy -4,4'-dimethoxy.

2.4 Esters of benzoic acids, optionally substituted, such as, for example: phenyl salicylate, 4-t-butylphenyl salicylate, octylphenyl salicylate, benzoyl resorcinol, bis(4-t-butylbenzoyl)resorcinol, dibenzoyl resorcinol, 2,4-di-t-butylphenyl-3,5-di-t-butyl-4-hydroxybenzoate, hexadecyl-3, 5-di-t-butyl-4-hydroxybenzoate, octadecyl -3,5-di-t-butyl-4-hydroxybenzoate, 2-methyl-4,6-di-t-butylphenyl -3,5-di-t-butyl-4-hydroxybenzoate.

2.5 Acrylates such as, for example, ethyl or iso-octyl α-cyano-β,β-diphenylacrylate; methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl) -2-methylindoline.

2.6 Nickel compounds such as, for example, Ni-complexes of 2,2'-thio-bis-[4-(1,1,3,3-tetramethylbutyl)phenol], for example 1:1 or 1:2 complexes, with or without additional ligands such as n-butylamine, triethanolamine or N-cyclohexyldiethanolamine, nickel dibutyldithiocarbamate, nickel salts of monoalkyl esters of 4-hydroxy-3,5-di-t-butyl-benzylphosphonic acid, such as methyl or ethyl esters, nickel complexes with ketoximes such as 2-hydroxy -4-methylphenyl undecyl ketoxime, nickel complexes of 1-phenyl-4-lauroyl-5-hydroxypyrazol with or without additional ligands.

2.7 Sterically hindered amines and their N-alkoxy derivatives such as, for example: poly-methylpropyl-3-oxy-[4-(2,2,6, 6-tetramethyl)piperidinyl]siloxane, polymethylpropyl -3-oxy-[4-(1,2,2,6,6-pentamethyl)piperidinyl]siloxane, bis-(2,2,6,6-tetramethyl-4-piperidinyl)sebacate; bis(2,2,6, 6-tetramethyl-4-piperidinyl) succinate; bis (1,2,2,6,6-pentamethyl-4-piperidinyl)sebacate; bis(1-octyloxy -2,2,6,6-tetramethyl-4-piperidinyl) sebacate; bis(1,2,2,6,6-pentamethyl-4-piperidyl)-n-butyl-3,5-di-t-butyl -4-hydroxybenzylmalonate; condensation product between 1-(2-hydroxyethyl)-2,2,6,6-tetramethyl-4-hydroxypiperidine and succinic acid; condensation product, linear or cyclic, between N,N'-bis(2,2,6,6-tetramethyl-4-piperidyl)hexamethylendiamine and 4-t-octylamino-2,6-dichloro-1,3,5-s-triazine; tris(2,2,6,6-tetramethyl-4-piperidyl)nitrilotriacetate; tetrakis (2,2,6,6-tetramethyl-4-piperidyl) -1,2,3,4-butanetetracarboxylate; 1,1'-(1,2-ethanodiyl)bis (3,3,5,5-tetramethylpiperazinone); 4-benzoyl-2,2,6,6-tetramethylpiperidine; 4-stearyloxy-2, 2,6,6-tetramethylpiperidine; bis(1,2,2,6,6-pentamethylpiperidyl)-2-n-butyl -2-(2-hydroxy-3,5-di-t-butylbenzyl) malonate; 3-n-octyl -7,7,9,9-tetramethyl-1,3,8-triazaspiro [4.5]decane-2,4-di-one; bis (1-octyloxy-2,2,6,6-tetramethylpiperidyl)sebacate; bis(1-octyloxy-2,2,6,6-tetramethylpiperidyl)succinate; condensation product, linear or cyclic, between N,N'-bis(2,2,6,6-tetramethyl-4-piperidyl)hexamethylenediamine and 4-morpholine-2,6-dichloro-1,3,5-triazine; condensation product between 2-chloro-4,6-di-(4-n-butylamino-2,2,6,6-tetramethylpiperidyl)-1,3,5-triazine and 1,2-bis(3-aminopropylamino) ethane; condensation product between 2-chloro-4,6-di-(4-n-butylamino-1,2,2,6,6-pentamethylpiperidyl) -1,3,5-triazine and 1,2-bis(3-aminopropylamino)ethane; 8-acetyl-3-dodecyl-7,7,9,9-tetramethyl -1,3,8-triazaspiro [4.5]decane-2,4-dione; 3-dodecyl-1-(2,2,6,6-tetramethyl-4-piperidyl)pyrrolidin-2,5-dione; 3-dodecyl -1-(1,2,2,6,6-pentamethyl-4-piperidyl)pyrrolidin -2,5-dione; mixture of 4-hexadecyloxy- and 4-stearyloxy -2,2,6,6-tetramethylpiperidine; condensation product between N-N'-bis(2,2,6,6-tetramethyl-4-piperidyl)hexamethylenediamine and 4-cyclohexylamino-2,6-dichloro-1,3,5-triazine; condensation product between 1,2-bis(3-aminopropylamino)ethane and 2,4,6-trichloro-1,3,5-triazine, as well as 4-butylamino-2,2, 6,6-tetramethylpiperidine (CAS Reg. Nr. [136504-96-6]; N-(2,2,6,6-tetramethyl-4-piperidyl)-n-dodecylsuccinimide; N-(1,2,2,6,6-pentamethyl-4-piperidyl)-n-dodecylsuccinimide; 2-undecyl-7,7,9,9-tetramethyl -1-oxa-3,8-diaza-4-oxospiro[4.5]decane; reaction product between 7,7,9,9-tetramethyl-2-cycloundecyl-1-oxa -3,8-diaza-4-oxospiro-[4.5]decane and epichlorohydrin; 1,1-bis(1,2,2,6,6-pentamethyl-4-piperidyloxycarbonyl)-2-(4-methoxyphenyl)ethene; N,N'-bis-formyl-N,N'-bis(2,2,6, 6-tetramethyl -4-piperidyl)hexamethylenediamine; diester of 4-methoxy-methylenemalonic acid with 1,2,2,6,6-pentamethyl -4-hydroxypiperidine; reaction product of maleic anhydride/α-olefin copolymer with 2,2,6,6-tetramethyl-4-aminopiperidine or with 1,1,2,2,6-pentamethyl-4-aminopiperidine.

2.8 Oxamides such as, for example: 4,4'-dioctyloxyoxanilide; 2,2'-diethoxyoxanilide; 2,2'-dioctyloxy-5,5'-di-t-butoxanilide; 2,2'-didodecyloxy-5,5'-di-t-butyloxanilide; 2-ethoxy-2'-ethyloxanilide; N,N'-bis (3-dimethylaminopropyl)oxamide; 2-ethoxy-5-t-butyl-2'-ethyloxanilide and its mixtures with 2-ethoxy-2'-ethyl-5,4'-di-t-butoxanilide; and mixtures of di-substituted ortho- and para-methoxy oxanilides and mixtures of di-substituted ortho and para-ethoxy oxanilides.

2.9 2-(2-hydroxyphenyl)-1,3,5-triazines such as, for example: 2,4,6-tris(2-hydroxy-4-octyloxyphenyl)-1,3,5-triazine; 2-(2-hydroxy-4-octyloxyphenyl)-4,6-bis(2,4-dimethylphenyl) -1,3,5-triazine; 2-(2,4-dihydroxyphenyl)-4,6-bis(2,4-dimethylphenyl)-1,3,5-triazine; 2,4-bis-(2-hydroxy -4-propyloxyphenyl)-6-(2,4-dimethylphenyl)-1,3,5-triazine; 2-(2-hydroxy-4-octyloxyphenyl)-4,6-bis (4-methylphenyl) -1,3,5-triazine; 2-(2-hydroxy-4-dodecyloxyphenyl) -4,6-bis(2,4-dimethylphenyl)-1,3,5-triazine; 2-[2-hydroxy-4-(2-hydroxy-3-butyloxypropyloxy)phenyl]-4,6-bis(2,4-dimethylphenyl)-1,3,5-triazine; 2-[2-hydroxy-4-(2-hydroxy-3-octyloxypropyloxy)phenyl]-4,6-bis-(2,4-dimethylphenyl) -1,3,5-triazine; 2-(2-hydroxy-4-tridecyloxyphenyl) -4,6-bis (2,4- dimethylphenyl)-1,3,5-triazine; 2-[4-(dodecyloxy/tridecyloxy-2-hydroxypropoxy)-2-hydroxyphenyl]3-4,6-bis(2,4-dimethylphenyl)-1,3,5-triazine; 2-[2-hydroxy -4-(2-hydroxy-3-dodecyloxypropoxy)phenyl]-4,6-bis-(2,4-dimethylphenyl)-1,3,5-triazine; 2-(2-hydroxy-4-hexyloxyphenyl) -4,6-diphenyl-1,3,5-triazine; 2-(2-hydroxy-4-methoxyphenyl)4,6-diphenyl-1,3,5-triazine; 2,4,6-tris[2-hydroxy -4-(3-butoxy-2-hydroxypropoxy)phenyl]-1,3,5-triazine; 2-(2-hydroxyphenyl)-4-(4-methoxyphenyl)-6-phenyl -1,3,5-triazine; 2-{2-hydroxy-4-[3-(2-ethylhexyl-1-oxy)-2-hydroxypropyloxy]phenyl}-4,6-bis(2,4-dimethylphenyl) -1,3,5-triazine.

3. "Metal-deactivators" such as, for example: N,N'-di-phenyloxamide, N-salicylal-N'-salicyloyl-hydrazine, N,N'-bis (salicyloyl)hydrazine, N,N'-bis(3,5-di-t-butyl-4-hydroxyphenylpropionyl)hydrazine, 3-salicyloylamino-1,2,4-triazole, bis(benzylidene)oxallyl dihydrazide, oxanilide, isophthaloyl dihydrazide, sebacoyl bisphenylhydrazide, N,N'-diacetyladipoyl dihydrazide, N,N'-bis (salicyloyl) oxallyl dihydrazide, N,—N'-bis(salicyloyl) thiopropionyl dihydrazide.

4. Phosphites and phosphonites such as, for example: triphenyl phosphite, diphenyl alkyl phosphates, phenyl dialkyl phosphites, tris(nonylphenyl)phosphite, trilauryl phosphite, trioctadecyl phosphite, distearyl pentaerythritol diphosphite, tris(2,4-di-t-butylphenyl) phosphite, diisodecyl pentaerythritol diphosphite, bis(2,4-di-t-butylphenyl) pentaerythritol diphosphite, bis(2,6-di-t-butyl-4-methylphenyl)pentaerythritol diphosphite, diisodecyloxypentaerythritol diphosphite, bis(2,4-di-t-butyl -6-methylphenyl)pentaerythritol diphosphite, bis [2,4,6-tris(t-butylphenyl)]pentaerythritol diphosphite, tristearyl sorbitol triphosphite, tetrakis-(2,4-di-t-butylphenyl) -4,4'-diphenylenediphosphonite, 6-isooctyloxy -2,4,8,10-tetra-t-butyl-12H-dibenzo-[d,g]-1,3,2-dioxaphosphocine, 6-fluoro-2,4,8,10-tetra-t-butyl-12-methyldibenzo[d,g]-1,3,2-dioxaphosphocine, bis-(2,4-di-t-butyl -6-methylphenyl)methylphosphite, bis(2,4-di-t-butyl -6-methylphenyl) ethylphosphite; 2,2',2'-nitrilo[triethyl-tris (3,3',5,5'-tetra-t-butyl-1,1'-biphenyl-2,2'-diyl)-phosphite]; 2-ethylhexyl-(3,3',5,5'-tetra-t-butyl -1,1'-biphenyl-2,2'-diyl)phosphite.

5. Hydroxylamines such as, for example: N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; N,N-dialkylhydroxylamines deriving from hydrogenated tallow amines.

6. Nitrons such as, for example: N-benzyl-α-phenylnitron; N-ethyl-α-methyl-nitron; N-octyl-α-heptyl-nitron; N-lauryl-α-undecyl-nitron; N-tetradecyl-α-tridecyl-nitron; N-hexadecyl-α-pentadecyl-nitron; N-octadecyl-α-heptadecyl-nitron; N-hexadecyl-α-heptadecyl-nitron; N-octadecyl-α-pentadecyl-nitron; N-heptadecyl-α-heptadecyl-nitron; N-octadecyl-α-hexadecyl-nitron; nitrons deriving from hydrogenated tallow amines.

7. Thiosynergizing agents such as, for example: dilauryl thiodipropionate; distearyl thiodipropionate.

8. Agents which are capable of destroying peroxides such as, for example, esters of β-thiodipropionic acid such as lauryl, stearyl, myristyl or tridecyl esters, mercaptobenzimidazole or zinc salt of 2-mercaptobenzimidazole, zinc dibutyldithiocarbamate, dioctadecyldisulfide, pentaerythritol tetrakis (β-dodecylmercapto)propionate.

9. Polyamide stabilizers such as, for example, copper salts combined with compounds of iodine and/or phosphorous, divalent manganese salts.

10. Basic co-stabilizers such as, for example: melamine, polyvinylpyrrolidone, dicyanodiamide, triallyl cyanurate, derivatives of urea, derivatives of hydrazine, amines, polyamides, polyurethanes, salts of alkaline metals and salts of earth-alkaline metals of fatty acids with a high molecular weight such as, for example, Ca-stearate, Zn-stearate, Mg-stearate, Mg-behenate, Na-ricinoleate, K-palmitate, antimonium-pyrocatecholate, tin-pyrocatecholate, zinc-pyrocatecholate.

11. Nucleating agents such as, for example: inorganic substances such as talc, metal oxides (for example, titanium dioxide or magnesium oxide), phosphates, carbonates or sulfates (preferably of earth-alkaline metals); organic compounds such as mono- or polycarboxylic acids and their salts (for example, 4-t-butylbenzoic acid, adipic acid, diphenylacetic acid, sodium succinate, sodium benzoate); polymeric compounds such as ionic copolymers ("ionomers").

12. Fillers and reinforcing agents such as, for example: calcium carbonate, silicates, glass fibres, glass beads, asbestos, talc, kaolin, mica, barium sulfate, metal oxides and hydroxides, carbon black, graphite, wood flour and flours or fibres of other natural products, synthetic fibres.

13. Other additives such as, for example: plasticizers, pigments, lubricants, emulsifying agents, Theological additives, catalysts, slip agents, optical brighteners, flame-retardants (for example bromurates, chlorurates, phosphorates and phosphorous/halogen mixtures), antistatic agents, blowing agents.

14. Benzofuranones and indolinones such as, for example: 3-[4-(2-acetoxyethoxy)phenyl]-5,7-di-t-butyl-benzofuran-2-one; 5,7-di-t-butyl-3-[4-(2-stearoyloxyethoxy)phenyl]-benzofuran-2-one; 3,3'-bis [5,7-di-t-butyl-3-[4-(2-hydroxyethoxy)phenyl]benzofuran-2-one; 5,7-di-t-butyl-3-(4-ethoxyphenyl]benzofuran -2-one; 3-(4-acetoxy-3,5-dimethylphenyl) -5,7-di-t-butyl-benzofuran-2-one; 3-(3,5-dimethyl -4-pivaloyloxyphenyl)-5,7-di-t-butyl-benzofuran-2-one; or those described in U.S. Pat. Nos. 4,325,863, 4,338,244, 5,175,312, 5,216,052 and 5,252,643; in German patents DE 4,316,611, 4,316,622 and 4,316,876; or in European patent applications No. 589,839 and 591,102.

The above stabilizers (co-stabilizers) can be optionally added to the organic polymers to be stabilized in a quantity ranging from 0.01% to 10% with respect to the total weight of the organic polymer to be stabilized.

The incorporation of the liquid stabilizing mixtures, object of the present invention, as such or optionally in the presence of other stabilizers (co-stabilizers), in the organic polymers to be stabilized, can be carried out according to the methods known in the art, for example, before or during the processing.

The above mixtures, optionally in the presence of other stabilizers (co-stabilizers), can also be added to the organic polymers to be stabilized, either after or during polymerization or before cross-linking.

The present invention also relates to a method for stabilizing organic polymers against degradation caused by oxygen, heat and/or light, which comprises the addition of said organic polymers to the stabilizing mixtures, object of the present invention.

Some illustrative but non-limiting examples of the present invention are provided for a better understanding of the present invention and for its embodiment.

EXAMPLE 1

200 g of Anox ® BF of Great Lakes Chemical Corporation, a light yellow liquid, having a viscosity equal to 64 mPaxsec. at 50 °C. (measured with a Haake viscometer), are charged into a 500 ml reactor equipped with a stiffer and thermometer, and heated to 120°C. Anox ® BF has the structure:

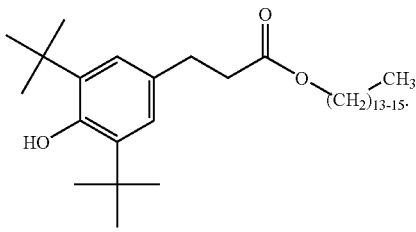

100 g of drops of Lowinox ® CPL of Great Lakes Chemical Corporation are added, in 15 minutes and at 1200C., the whole mixture being maintained under stirring. After 30 minutes, the resulting amber-coloured mixture is left to cool to room temperature. Gas chromatographic (GC) analysis shows that no chemical reaction has taken place between the two compounds. Lowinox ® CPL (700-800 MW) is the reaction product of p-cresol and dicyclopentadiene, alkylated with isobutylene and has the structure:

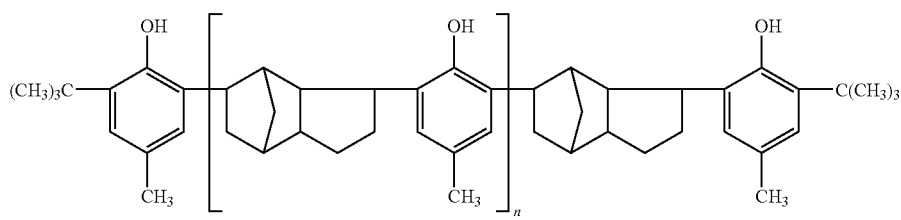

wherein n is an integer ranging from 0 to 10.

The above gas chromatographic analysis is carried out using a Hewlett Packard 5980, series II gas chromatograph, operating under the following conditions:

T.A.P.-CB (Triglyceride Analysis Phase) capillary column made of molten silica 50% phenyl/50% methylpolysiloxane, having a length of 10 m, an internal diameter of 0.25 mm and a film thickness of 0.1 µm (commercialized by Crompack);

oven temperature program: from 70° C. to 350° C. with an increase of 15° C./min.; final isotherm 10 min.;

carrier gas: helium at 3.3 ml/min.;

injection system: "on column";

injector temperature: 73° C.;

detector temperature: 360° C.;

volume injected: 1.0 µl;

sample concentration: 1.0 mg/ml in toluene.

The viscosity of the mixture, measured with a Haake viscometer, is equal to 384 mPaxsec. at 70° C.

EXAMPLE 2

An aging test is carried out on samples of SBR rubber of the Europrene 1502 type, commercialized by EniChem Elastomeri using the mixture indicated in Table 1.

TABLE 1

| COMPONENTS | QUANTITY (%) |
|---|---|
| Europrene 1502 | 100.0 |
| Zinc oxide | 5.0 |
| Ultrasil VN/3 * | 35.0 |
| Glicogum 4000 ** | 1.0 |
| Titanium oxide | 3.0 |
| Sulfur | 1.5 |
| mercapto benzothiazole disulfide | 2.0 |
| Zinc dibenzyldithiocarbamate | 0.2 |
| stabilizer *** | 1.0 |

\* = type of silica;

\*\* = ethoxylated polyethyleneglycol having a molecular weight of 4000;

\*\*\* = stabilizers used indicated in Table 2 below.

TABLE 2

| TEST Nr | STABILIZER |
|---|---|
| 1 | — |
| 2 | Anox ® T * (a sterically hindered phenol) |
| 3 | Lowinox ® CPL * (a polymeric sterically hindered phenol) |
| 4 | Anox ® 20 * (a sterically hindered phenol) |
| 5 | Anox ® BF * (a sterically hindered phenol) |
| 6 | Mixture example 1 (a sterically hindered phenol) |

\*: products commercialized by Great Lakes Chemical Corporation.

The blends obtained as described above are vulcanized at 160° C. for 20 minutes obtaining rubber strips having dimensions of 200×200 mm and a thickness of 2 mm.

Standard 10 cm DUMBBELL test-samples are obtained from the above strips in accordance with regulation ASTM D412, and are subjected to aging in an oven at 100° C. Samples are taken at different times: 96 hours, 144 hours, 240 hours and 288 hours, on which the antioxidant property of the various additives is evaluated by measuring the variation in the tensile strength and elongation at break: the values obtained are indicated in Table 3 and Table 4 respectively.

TABLE 3

TENSILE STRENGTH VARIATION

| Test nr. | Original values | 96 hours | Decay (%) | 144 hours | Decay (%) | 240 hours | Decay (%) | 288 hours | Decay (%) |
|---|---|---|---|---|---|---|---|---|---|
| 1 | 214 | 203 | −5.1 | 163 | −23.8 | 57 | −73.4 | 32 | −85.0 |
| 2 | 198 | 195 | −1.5 | 177 | −10.6 | 114 | −42.4 | 97 | −51.0 |
| 3 | 193 | 174 | −9.8 | 175 | −9.3 | 114 | −40.9 | 57 | −70.5 |
| 4 | 201 | 213 | −5.4 | 164 | −18.4 | 121 | −39.8 | 96 | −52.2 |
| 5 | 194 | 208 | +7.2 | 160 | −17.5 | 116 | −40.2 | 96 | −50.5 |
| 6 | 193 | 212 | +9.8 | 164 | −15.0 | 115 | −40.4 | 87 | −54.9 |

TABLE 4

ELONGATION AT BREAK VARIATION

| Test nr. | Original values | 96 hours | Decay (%) | 144 hours | Decay (%) | 240 hours | Decay (%) | 288 hours | Decay (%) |
|---|---|---|---|---|---|---|---|---|---|
| 1 | 860 | 550 | −36.0 | 415 | −51.7 | 130 | −84.9 | 30 | −96.5 |
| 2 | 840 | 555 | −33.9 | 450 | −46.4 | 260 | −69.0 | 205 | −75.6 |
| 3 | 840 | 530 | −36.9 | 450 | −46.4 | 240 | −71.4 | 125 | −85.1 |
| 4 | 840 | 585 | −30.4 | 425 | −49.4 | 285 | −66.1 | 225 | −73.2 |
| 5 | 840 | 595 | −29.2 | 440 | −47.6 | 290 | −65.5 | 245 | −70.8 |
| 6 | 825 | 585 | −29.1 | 455 | −44.8 | 270 | −67.3 | 195 | −76.4 |

The above results demonstrate that with the liquid stabilizing mixture, object of the present invention (Test Nr. 6), the antioxidant power remains unaltered.

The invention claimed is:

1. A liquid stabilizing mixture for organic polymers or copolymers comprising:

(a) a sterically hindered phenol having formula (I):

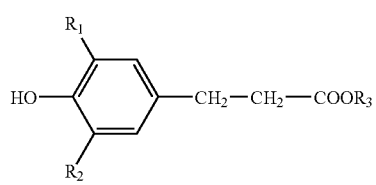

wherein:
$R_1$ and $R_2$ are both t-butyl;
$R_3$ is a linear $C_{14}$-$C_{16}$ alkyl group, (b) a sterically hindered phenol having formula (II):

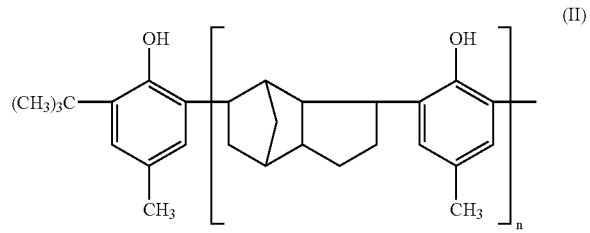

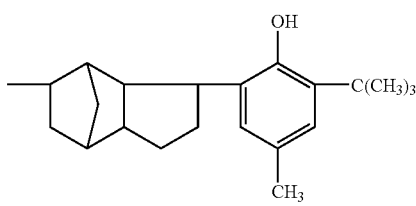

wherein n is an integer ranging from 0 to 10, and the mixture is liquid both at room temperature and temperatures as low as −30°C.

2. A process for the preparation of the liquid stabilizing mixture of claim 1 which comprises:

(a') heating a liquid compound of the sterically hindered phenol (a) to a temperature ranging from 60°C to 180°C, under stirring;

(b') adding a solid compound selected from the group consisting of the sterically hindered phenol (b), maintaining the temperature within the range of 60°C to 180°C, and maintaining the whole mixture under stirring until the complete dissolution of said compound (b), for a time ranging from 5 minutes to 100 minutes to obtain a liquid stabilizing mixture.

3. The process according to claim 2, wherein the weight ratios between the liquid compound (a) and the solid compound (b) range from 90:10 to 30:70.

4. The process according to claim 2, wherein the weight ratios between the liquid compound (a) and the solid compound (b) range from 60:40 to 70:30.

5. A liquid stabilizing mixture for organic polymers or copolymers comprising:

(a) a sterically hindered phenol having formula (I):

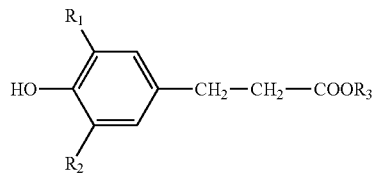

wherein:
$R_1$ and $R_2$ are both t-butyl;
$R_3$ is a linear $C_{14}$-$C_{16}$ alkyl group,
(b) a sterically hindered phenol having formula (II):

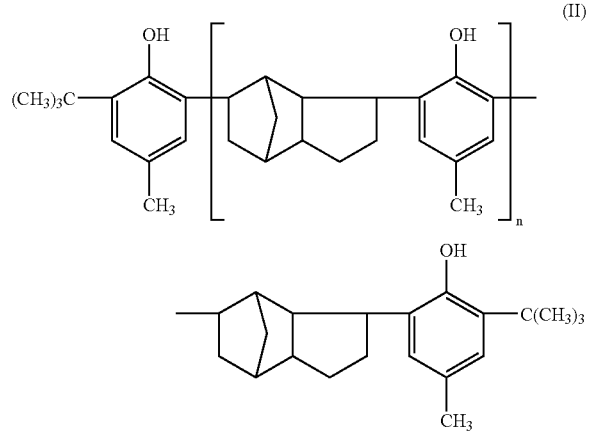

wherein n is an integer ranging from 0 to 10, and the mixture is permanently liquid both at room temperature and temperatures as low as -30°C.

6. A liquid stabilizing mixture for organic polymers or copolymers comprising:
(a) a first sterically hindered phenol having formula (I):

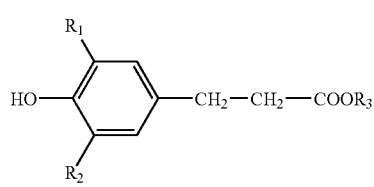

wherein:
$R_1$ and $R_2$ are both t-butyl;
$R_3$ is a linear $C_{14}$-$C_{16}$ alkyl group,
(b) a second sterically hindered phenol comprising the reaction product of p-cresol and dicyclopentadiene, alkylated with isobutylene;
wherein the mixture is liquid both at room temperature and temperatures as low as -30°C.

7. The mixture according to claim 6, wherein the second sterically hindered phenol comprises the formula (II):

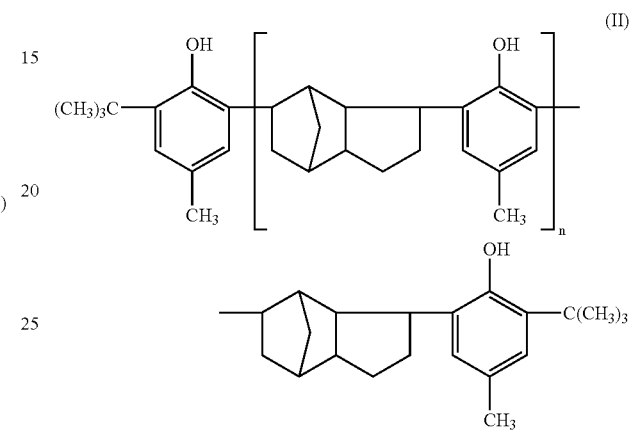

wherein n is an integer ranging from 0 to 10.

8. A liquid stabilizing mixture for organic polymers or copolymers comprising:
(a) a first sterically hindered phenol having formula (I):

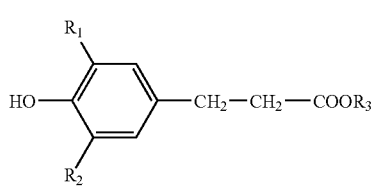

wherein:
$R_1$ and $R_2$ are both t-butyl;
$R_3$ is a linear $C_{14}$-$C_{16}$ alkyl group,
(b) a second sterically hindered phenol comprising the reaction product of p-cresol and dicyclopentadiene, alkylated with isobutylene;
wherein the mixture is permanently liquid both at room temperature and temperatures as low as -30°C.

* * * * *